(12) United States Patent
Park et al.

(10) Patent No.: US 8,345,596 B2
(45) Date of Patent: Jan. 1, 2013

(54) CALL CONTROL METHOD FOR SEAMLESS MOBILITY SERVICE

(75) Inventors: No-ik Park, Seoul (KR); Soon-seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1155 days.

(21) Appl. No.: 12/203,632

(22) Filed: Sep. 3, 2008

(65) Prior Publication Data

US 2009/0154394 A1    Jun. 18, 2009

(30) Foreign Application Priority Data

Dec. 18, 2007    (KR) ........................ 10-2007-0133347

(51) Int. Cl.
*H04W 4/00*         (2009.01)
(52) U.S. Cl. ........................................................ 370/328
(58) Field of Classification Search .................... 370/328
See application file for complete search history.

(56) References Cited

U.S. PATENT DOCUMENTS

| | | | |
|---|---|---|---|
| 2003/0076819 A1* | 4/2003 | Emerson, III | 370/352 |
| 2003/0088767 A1* | 5/2003 | Emerson, III | 713/153 |
| 2003/0228868 A1 | 12/2003 | Turanyi et al. | |
| 2004/0122976 A1* | 6/2004 | Dutta et al. | 709/245 |
| 2007/0094712 A1* | 4/2007 | Gibbs et al. | 726/3 |
| 2007/0199062 A1* | 8/2007 | Cho | 726/12 |

FOREIGN PATENT DOCUMENTS

| | | |
|---|---|---|
| EP | 1551144 A1 | 7/2005 |
| KR | 1020040089203 | 10/2004 |
| KR | 102006006660 | 6/2006 |
| KR | 102006110151 | 10/2006 |
| KR | 100895283 | 4/2009 |

* cited by examiner

*Primary Examiner* — Sulaiman Nooristany
(74) *Attorney, Agent, or Firm* — Nelson Mullins Riley & Scarborough LLP; EuiHoon Lee, Esq.

(57) ABSTRACT

A call control method for an Internet Protocol (IP)-based mobility service is provided. The call control method for ensuring service continuity in a mobile communication service environment, includes: receiving a call signal message including permanent IP addresses and transport IP addresses from a transmitter terminal and a receiver terminal, and acquiring the permanent IP addresses and the transport IP addresses of the transmitter terminal and the receiver terminal; and performing call control between the transmitter terminal and the receiver terminal on the basis of the transport IP addresses and the permanent IP addresses of the transmitter terminal and the receiver terminal. Therefore, by interfacing with an IP multimedia subsystem (IMS) for controlling a Session Initiation Protocol (SIP)-based service, an IP mobility control apparatus for controlling mobility of a terminal when a call is controlled, and a network control apparatus for controlling a network, it is possible to prevent data transmission from being interrupted while the terminal is moving, thereby providing an IP-based seamless, high-quality service.

9 Claims, 5 Drawing Sheets

CALL CONTROL METHOD FOR SEAMLESS MOBILITY SERVICE

CROSS REFERENCE TO RELATED APPLICATIONS

This application claims priority from Korean Patent Application No. 10-2007-0133347, filed on Dec. 18, 2007, the disclosure of which is incorporated herein in its entirety by reference.

BACKGROUND OF THE INVENTION

1. Field of the Invention

The present invention relates to a method of providing an Internet Protocol (IP)-based mobility service, and more particularly, to a call control method for an Internet Protocol (IP)-based mobility service.

This work was supported by the IT R&D program of Ministry of Information and Communication (MIC)/Institute for Information Technology Advancement (IITA) [2006-S-064-02, BcN Network Engineering].

2. Description of the Related Art

Recently, many users are utilizing network services such as the Internet while they are moving as well as when they stay in a specific region. Accordingly, in a next-generation network such as Next Generation Networking (NGN), a service of proving IP mobility is important. Accordingly, development of various techniques for providing IP mobility is needed.

Conventionally, a method of providing IP mobility based on a mobile IP (MIP) standardized in the Internet Engineering Task Force (IETF) has been mainly used, however, the method could not be applied practically due to a limitation in the MIP.

The IMS interfaces with a network transport layer in order to efficiently provide IP multimedia services, and enables development of various application services. Particularly, the IMS allows a third party service provider other than a communication network provider to develop IMS-based services using an open-type connection structure.

However, the IMS has a structural limitation in supporting mobility. Accordingly, the IMS has difficulties in controlling services in a mobile environment.

SUMMARY OF THE INVENTION

The present invention provides a method for interfacing with an IP multimedia subsystem (IMS) to control a Session Initiation Protocol (SIP)-based service, an IP mobility control apparatus for controlling mobility of a terminal when a call is controlled, and a network control apparatus for controlling a network.

In more detail, the present invention provides a call control method which can provide a seamless IP-based service in a mobile environment by interfacing with an IMS, an IP mobility control apparatus, and a network control apparatus, thereby ensuring service continuity.

According to an aspect of the present invention, there is provided a call control method for ensuring service continuity in a mobile communication service environment, which is performed by a service control unit to control a Session Initiation Protocol (SIP)-based service, including: receiving a call signal message including permanent IP addresses and transport IP addresses from a transmitter terminal and a receiver terminal, wherein the permanent IP address does not participate in data transmission and is used as an identifier (ID) through which the location of the terminal is registered, and the transport IP address participates in actual data transmission, and acquiring the permanent IP addresses and the transport IP addresses of the transmitter terminal and the receiver terminal; and performing call control between the transmitter terminal and the receiver terminal on the basis of the transport IP addresses and the permanent IP addresses of the transmitter terminal and the receiver terminal.

The receiving of the call signal message includes: in a service control unit, acquiring the transport IP address of the receiver terminal from an IP mobility control unit in response to a call connection request from the transmitter terminal; transmitting packet data for requesting a call connection to the receiver terminal using the transport IP address of the receiver terminal; and acquiring the permanent IP address of the receiver terminal from packet data received from the receiver terminal in response to the packet data for requesting the call connection.

The receiving of the packet data includes, in the service control unit, acquiring the permanent IP address and the transport IP address of the transmitter terminal on the basis of a call connection request from the transmitter terminal.

The performing of the call control includes, in the service control unit, transmitting the permanent IP addresses and Quality of Service (QoS) information of the transmitter terminal and the receiver terminal to an IP mobility control unit. The call control method further includes: in the IP mobility control unit, acquiring the transport IP addresses of the transmitter terminal and the receiver terminal from prestored information on the basis of the permanent IP addresses of the transmitter terminal and the receiver terminal; and transferring the transport IP addresses and the QoS information of the transmitter terminal and the receiver terminal to a network control unit.

The call control method further includes, in an IP mobility control unit, receiving authentication user information from an authentication server and storing the authenticated user information. Also, the call control method further includes, receiving a permanent IP address and a transport IP address of a terminal authenticated by the authentication server, matching the permanent IP address and the transport IP address of the terminal to the authenticated user information, and storing the result of the matching.

Therefore, by interfacing with the IMS for controlling the SIP-based service, the IP mobility control apparatus for controlling mobility of a terminal when a call is controlled, and the network control apparatus for controlling the network, it is possible to prevent data transmission from being interrupted while the terminal is moving, thereby providing an IP-based seamless, high-quality service.

Accordingly, it is possible to increase profitability of a service provider and provide convenience to service subscribers.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
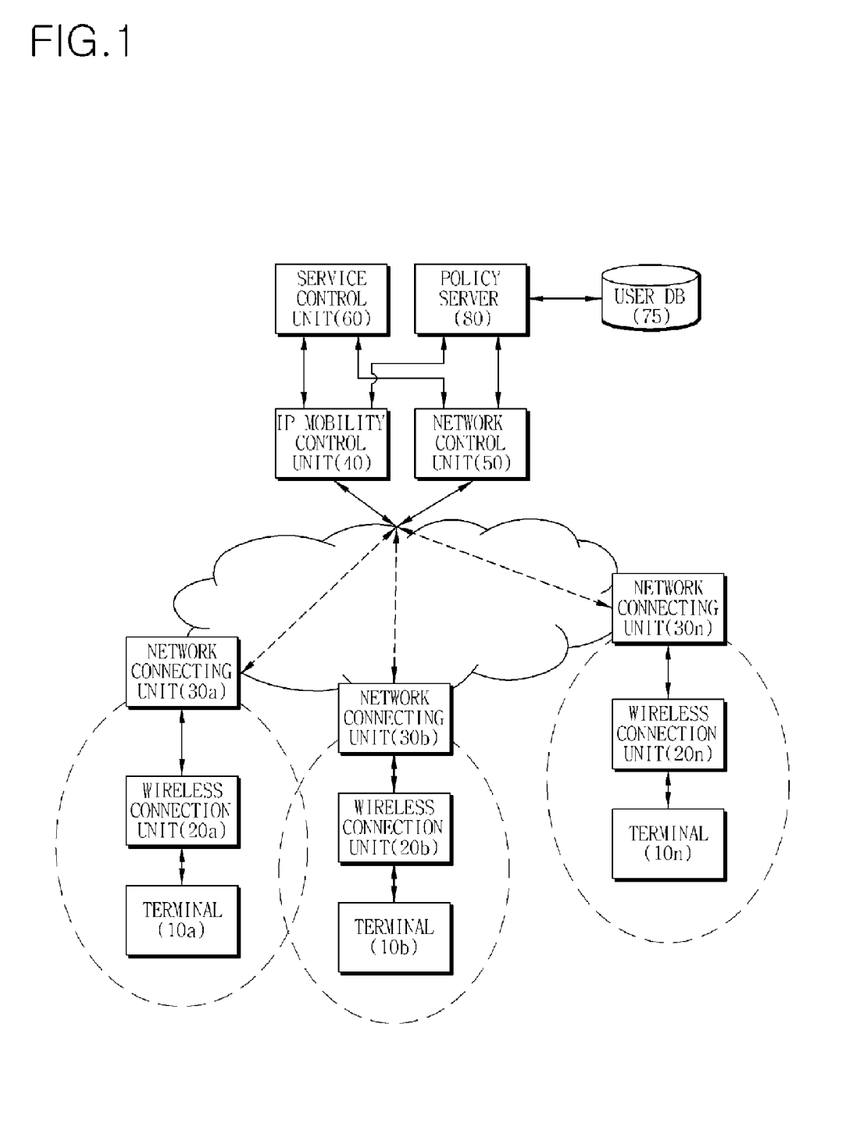
FIG. 1 is a block diagram of a call control system for ensuring service continuity, according to an embodiment of the present invention.

FIG. 1 is a block diagram of a call control system for ensuring service continuity, according to an embodiment of the present invention.

Referring to FIG. 1, the call control system includes: a plurality of subnets including a plurality of terminals 10a, 10b, ..., 10n and a plurality of wireless connecting units 20a, 20b, 20n; a plurality of network connecting units 30a, 30b, ..., 30c for connecting the respective subnets to a service network; a network control unit 50 for controlling the service network; an Internet Protocol (IP) mobility control unit 40 for controlling IP mobility of the terminals 10a, 10b, ..., 10n; and a service control unit 60 for controlling a Session Initiation Protocol (SIP)-based service.

The terminals 10a, 10b, ..., 10n may be communication terminals, such as cellular phones, Personal Digital Assistants (PDAs), and notebooks, which can use an IP address as an identifier. The wireless connecting units 20a, 20b, ..., 20n may be access points for controlling an access network. The terminals 10a, 10b, ..., 10n can be connected to the network connecting units 30a, 30b, ..., 30n through the wireless connecting units 20a, 20b, ..., 20n.

The network connecting units 30a, 30b, ..., 30n are used to connect the terminals 10a, 10b, ..., 10n to the service network, and may be routers.

The terminals 10a, 10b, ..., 10n can be connected to the service network through the wireless connecting units 20a, 20b, ..., 20n and the network connecting units 30a, 30b, ..., 30n, thereby receiving a service.

The IP mobility control unit 40 performs control related to IP mobility of the terminals 10a, 10b, ..., 10n which are connected to the service network through the network connecting units 30a, 30b, ..., 30n.

Each of the terminals 10a, 10b, ..., 10n has a permanent IP address which does not participate in data transmission, and a transport IP address which participates in data transmission. The permanent IP address is used as identification information for registering a location of the terminal and authenticating the terminal. Actual data transmission is performed using the transport IP address of the terminal.

If a terminal is connected to a different network connecting unit due to movement of the terminal, a network transmission apparatus allocates a new transport IP address to the terminal.

According to an embodiment of the present invention, data that is to be transmitted from a terminal includes a permanent IP address and a transport IP address of the terminal. Actual transmission of the data is performed using the transport IP address, and the permanent IP address may be recognized as a part of payload. For example, the permanent IP address may be based on IPv6, and the transport IP address may be based on IPv4. Or, both the permanent IP address and the transport IP address may be based on IPv6.

The IP mobility control unit 40 binds and stores an acquired permanent IP address and transport IP address in such a manner that they are matched to a terminal when the terminal is authenticated. Thus, the IP mobility control unit 40 can recognize location information of the terminal using the bound address information. Accordingly, it is possible to provide a seamless service to the terminal even when the terminal is moving.

In the current embodiment, the IP mobility control unit 40 transmits to the network control unit 50 control information related to IP mobility of the terminals 10a, 10b, ..., 10n. Then, the network control unit 50 controls the network connecting units 30a, 30b, ..., 30n on the basis of the control information related to mobility of the terminals 10a, 10b, ..., 10n.

At this time, the network control unit 50 receives subscriber information, service QoS information, etc., from a user DB 75 and a policy server 80, and acquires Service Level Agreement (SLA) of the corresponding subscriber. Then, the network control unit 50 controls the network connecting units 30a, 30b, ..., 30c to perform transmission of packet data according to the SLA of the subscriber.

Figure 2:
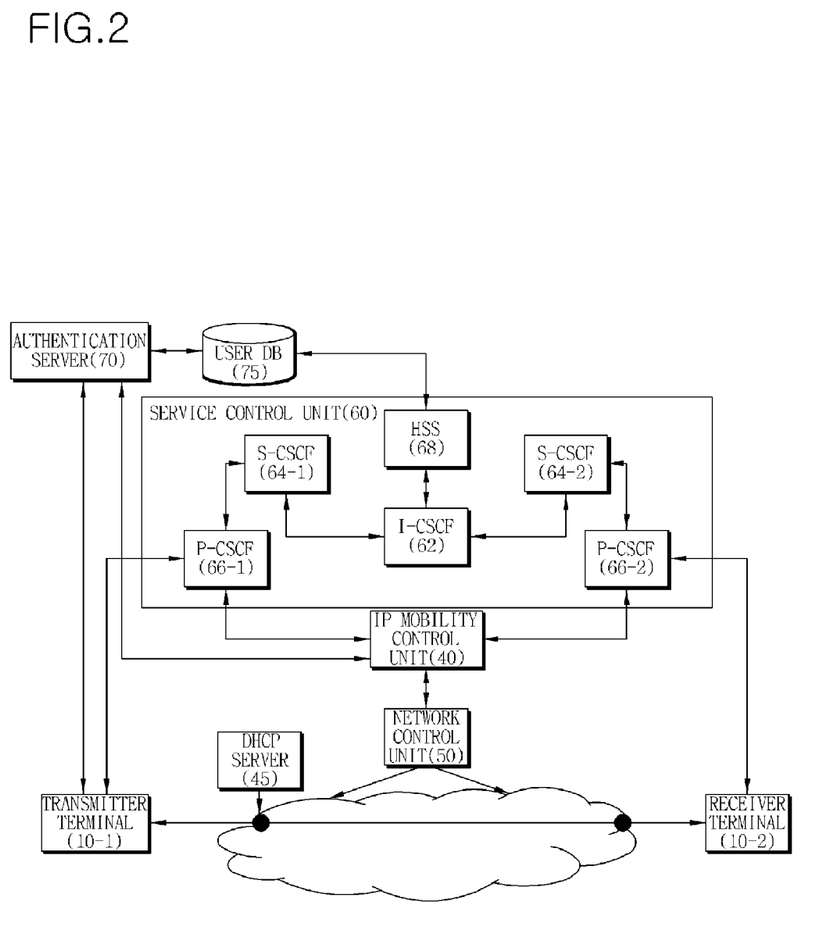
FIG. 2 is a block diagram of a call control system wherein a service control apparatus according to an embodiment of the present invention is shown in detail.

FIG. 2 is a block diagram of a call control system wherein the service control unit 60 according to an embodiment of the present invention is shown in detail.

The call control system further includes an authentication server 70 including a Dynamic Host Configuration Protocol (DHCP) server 45 which allocates a transport IP address dynamically to a terminal depending on movement of the terminal.

The authentication server 70 interfaces with the user DB 75 which stores user information, and may be an AAA server. The authentication server 70 functions as a subscriber server, and performs functions of authentication, authorization, accounting, etc. The user DB 75 stores information, such as MAC addresses of terminals, network access identifiers (NAIs), and ID/password information and permanent IP addresses of terminal users. The DHCP server 45 automatically allocates a new transport IP address to a transmitter terminal 10-1 or receiver terminal 10-2 when the transmitter terminal 10-1 or receiver terminal 10-2 is connected to a different network connecting unit.

The service control unit 60 may be an IP Multimedia Subsystem (IMS) for controlling SIP-based services. The service control unit 60 is used to process a user call, and can be functionally classified into a Home Subscriber Server (HSS) and a Call Session Control Function (CSCF). The CSCF is used to perform subscriber registration, authentication, accounting, triggering for each service, routing to a corresponding application server, inquiring a location of a receiver party, and compression and decompression of SIP messages, and also performs setting, adjustment, and management of user sessions. Also, the CSCF interfaces with a HSS in which information about subscriber profiles and data related to authentication and locations are stored. The CSCF is an infra system which performs a basic function for controlling SIP-based multimedia sessions, and can be classified into P-CSCF (Proxy-CSCF), I-CSCF (Interrogating-CSCF), and S-CSCF (Serving-CSCF). In the current embodiment, the service control unit 60 recognizes transport IP addresses and permanent IP addresses of the transmitter and receiver terminals 10-1 and 10-2 from a call signal message received from the transmitter and receiver terminals 10-1 and 10-2. Here, the call signal message includes a call connection request received from the transmitter terminal 10-1 and a response message to the call connection request, received from the receiver terminal 10-2.

P-CSCF 66-1 and 66-2 are first access points to which user terminals are connected on an IMS network, and function as a proxy between the user terminals and I-CSCF 62 for SIP registration. Also, when a SIP call is set up, the P-CSCF 66-1 and 66-2 function as a proxy between the user terminals and S-CSCF 64-1 and 64-2. According to an embodiment of the present invention, the P-CSCF 66-1 and 66-2 have to acquire a permanent IP address and transport IP address of a terminal, which is included in a call signal message. That is, the P-CSCF 66-1 and 66-2 have to acquire a permanent IP address of a terminal which is a part of a payload of a call signal message, as well as a transport IP address of the terminal.

The I-CSCF 62 is a first access point for accessing a provider network, and detects S-CSCF 64-1 or 64-2 in which a receiver terminal 10-2 is registered or detects a transmitter S-CSCF 64-1 or 64-2 of a user which roams in a service area of a present provider. Also, the I-CSCF 62 functions as a Topology Hiding Inter-network Gateway for preventing information about configuration, capacity, and topology of a provider network from leaking out to the outside.

In the current embodiment, the I-CSCF 62 interfaces with a HSS 68.

The S-CSCF 64-1 and 64-2 register in the HSS 68 a fact that the S-CSCF 64-1 and 64-2 are servers for controlling sessions of the transmitter and receiver terminals 10-1 and 10-2, and acquire and store subscriber information of the transmitter and receiver terminals 10-1 and 10-2. The S-CSCF 64-1 and 64-2 perform session control and state management on the registered transmitter and receiver terminals 10-1 and 10-2. The S-CSCF 64-1 and 64-2 interface with another application server to provide various services, or transfer SIP request and response messages to a Breakout Gateway Control Function (BGCF) to route messages transmitted through PSTN. In the current embodiment, the S-CSCF 64-2 can transmit a call connection request to the receiver terminal 10-2 via the P-CSCF 66-2 on the basis of a received SIP message.

Figure 3:
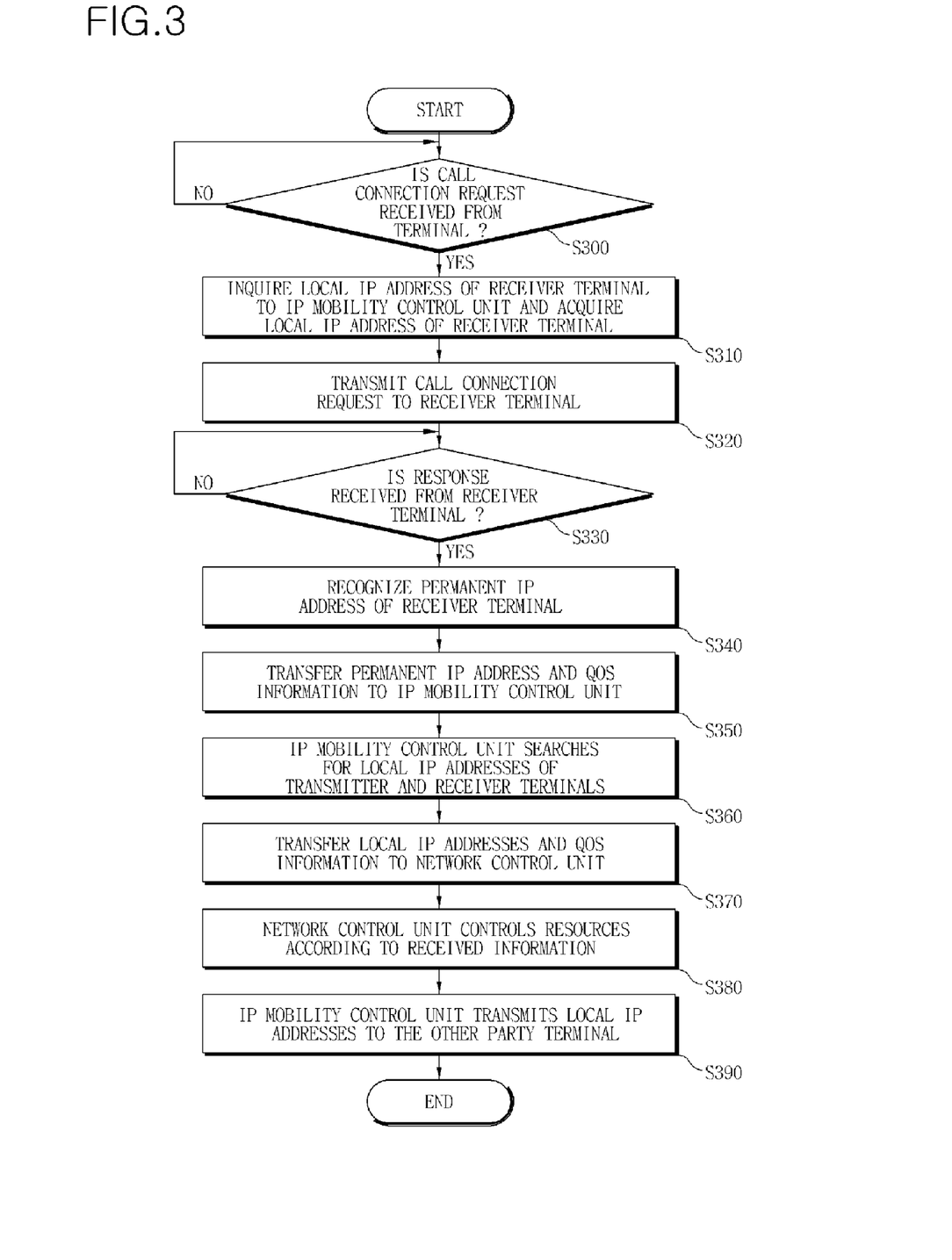
FIG. 3 is a flowchart of a call control method of ensuring service continuity, according to an embodiment of the present invention.

FIG. 3 is a flowchart of a call control method of ensuring service continuity, according to an embodiment of the present invention.

The service control unit receives a call connection request including a permanent IP address and a transport IP address of a transmitter terminal from the transmitter terminal (operation S300).

Accordingly, the transport IP address depending on a location of the transmitter terminal on a network, and the permanent IP address allocated specifically to the transmitter terminal can be acquired on the basis of the call connection request.

Also, the service control unit requests a transport IP address of a receiver terminal to an IP mobility control unit on the basis of the call connection request.

By transmitting uniform Resource Identifier (URI) information, etc. of the receiver terminal included in the call connection request to the IP mobility control unit, the transport IP address of the receiver terminal can be requested (operation S310). The Service control unit acquires the transport IP address of the receiver terminal from the IP mobility control unit, and the call connection request is transferred to the receiver terminal according to the transport IP address (operation S320).

The receiver terminal can output a bell signal, etc. to the outside in order to inform a fact that a call connection request is received. A user of the receiver terminal can respond to the call connection request by pressing a key of the receiver terminal. Accordingly, if the response to the call connection request is received by P-CSCF of the receiver terminal from the receiver terminal S330), the permanent IP address of the receiver terminal is acquired from the received response (operation S340). That is, the response to the call connection request received from the receiver terminal includes the permanent IP address and transport IP address of the receiver terminal.

Also, the service control unit transfers the permanent IP address of the transmitter terminal which is acquired from the call connection request, and the permanent IP address and QoS information of the receiver terminal which is acquired from the response to the call connection request, to the IP mobility control unit (operation S350).

Thereafter, the IP mobility control unit searches for permanent IP addresses of the transmitter terminal and the receiver terminal on the basis of the received permanent IP addresses (operation S360). Then, the searched transport IP addresses and QoS information of the transmitter terminal and receiver terminal are transferred to a network control unit (operation S370). Then, the network control unit controls network resources on the basis of the transport IP address and QoS information of the transmitter terminal and receiver terminal (operation S380).

Then, the IP mobility control unit transmits the transport IP address of the receiver terminal to the transmitter terminal, and transmits the transport IP address of the transmitter terminal to the receiver terminal (operation S390). Accordingly, point-to-point communications between the transmitter terminal and receiver terminal can be performed using resources allocated by the network control unit.

Figure 4:
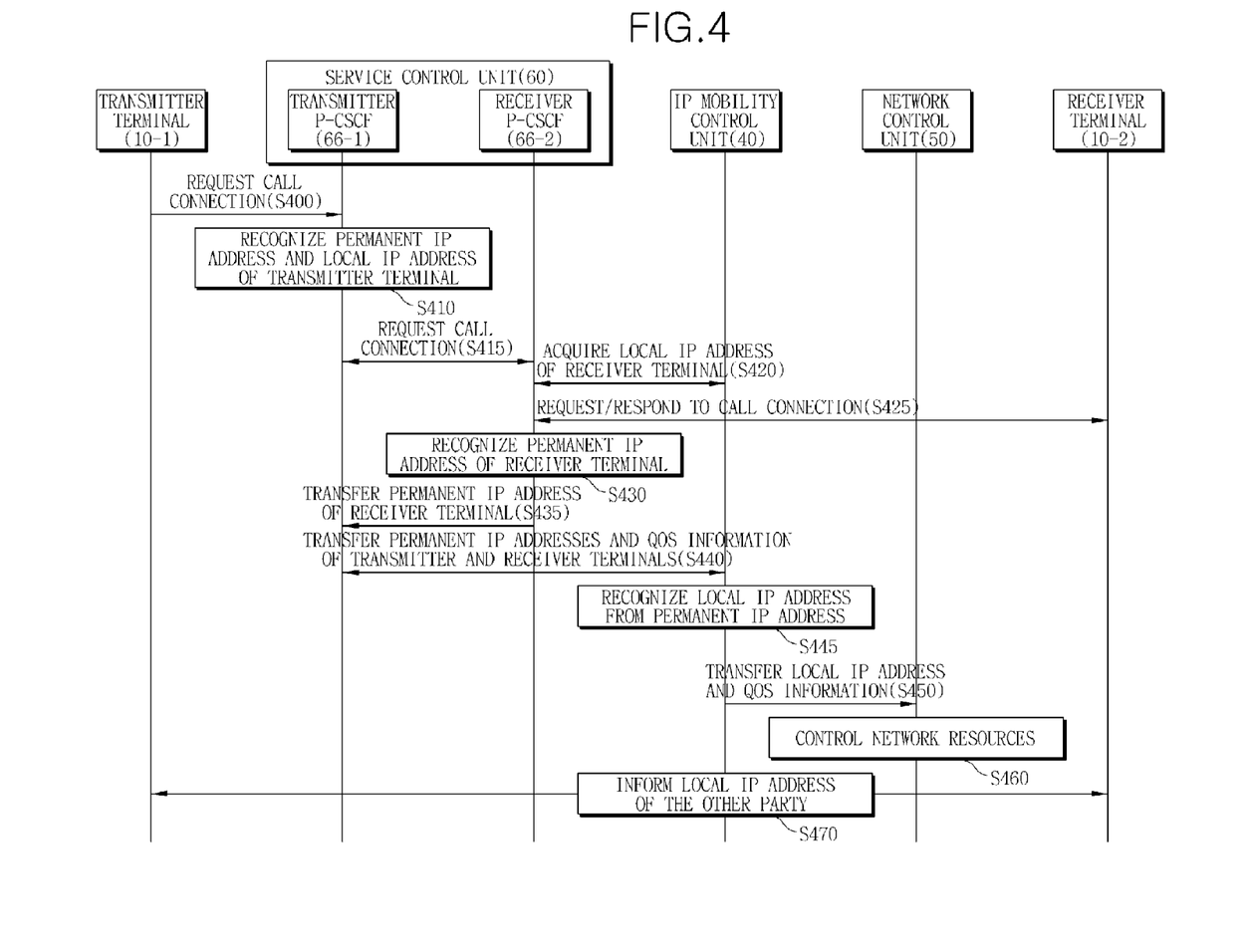
FIG. 4 shows data flow of a call control method of ensuring service continuity, according to an embodiment of the present invention.

FIG. 4 shows data flow of a call control method of ensuring service continuity, according to an embodiment of the present invention.

First, a transmitter terminal 10-1 transmits a call connection request via a transmitter P-CSCF 66-1 of a service control unit 60 (operation S422). Then, the transmitter P-CSCF 66-1 acquires a permanent IP address and transport IP address of the transmitter terminal 10-1 on the basis of the call connection request (operation S410).

For example, the transmitter P-CSCF 66-1 transmits a SIP INVITE message to I-CSCF 62. The I-CSCF 62 can recognize S-CSCF 64-1 and P-CSCF 66-2 to which a receiver terminal 10-2 belongs, from a HSS which interfaces with the I-CSCF 62. Then, the call connection request is transferred to a receiver P-CSCF 66-2 (operation S415). At this time, the receiver P-CSCF 66-2 requests a transport IP address of a receiver terminal 10-2 to an IP mobility control unit 40, and acquires the transport IP address of the receiver terminal 10-2 from the IP mobility control unit 40 (operation S420). The receiver P-CSCF 66-2 can request the transport IP address of the receiver terminal 10-2 through URI information, etc. of the receiver terminal 10-2.

The receiver P-CSCF 66-2 can transfer a call connection request to the receiver terminal 10-2 according to the transport IP address of the receiver terminal 10-2. Then, the receiver P-CSCF 66-2 receives a response to the call connection request from the receiver terminal 10-2 (operation S425). The P-CSCF 66-2 of the receiver terminal 10-2 have to acquire a permanent IP address of the receiver terminal 10-2 from the response to the call connection request received from the receiver terminal 10-2 (operation S430). The receiver P-CSCF 66-2 transmits the permanent IP address of the receiver terminal 10-2 to the transmitter P-CSCF 66-1 (operation S435). For example, the receiver P-CSCF 66-2 transmits the permanent IP address of the receiver terminal 10-2 to the transmitter P-CSCF 66-1 in a form of a SIP 200 OK message which is a response to the SIP INVITE message.

The transmitter P-CSCF 66-1 transfers to the IP mobility control unit 40 the permanent IP address of the transmitter terminal 10-1 and the permanent IP address of the receiver terminal 10-2 which are acquired from the receiver P-CSCF 66-2. The transmitter P-CSCF 66-1 also transmits QoS information of the transmitter and receiver terminals 10-1 and 10-2 to the IP mobility control unit 40 (operation S440).

Thereafter, the IP mobility control unit 40 searches for transport IP addresses of the transmitter and receiver terminals 10-1 and 10-2 on the basis of the received permanent IP addresses (operation S445). Then, the IP mobility control unit 40 transmits the permanent IP addresses and QoS information of the transmitter and receiver terminals 10-1 and 10-2 to a network control unit 50 (operation S450).

Then, the network control unit 50 performs network resource control and QoS provisioning between the transmitter and receiver terminals 10-1 and 10-2 on the basis of the transport IP addresses and QoS information of the transmitter and receiver terminals 10-1 and 10-2 (operation S460).

Thereafter, the IP mobility control unit 40 informs each of the transmitter and receiver terminals 10-1 and 10-2 of a transport IP address of the other party (operation S470). Accordingly, point-to-point communications between the transmitter terminal 10-1 and the receiver terminal 10-2 can be performed using resources allocated by the network control unit 50.

Figure 5:
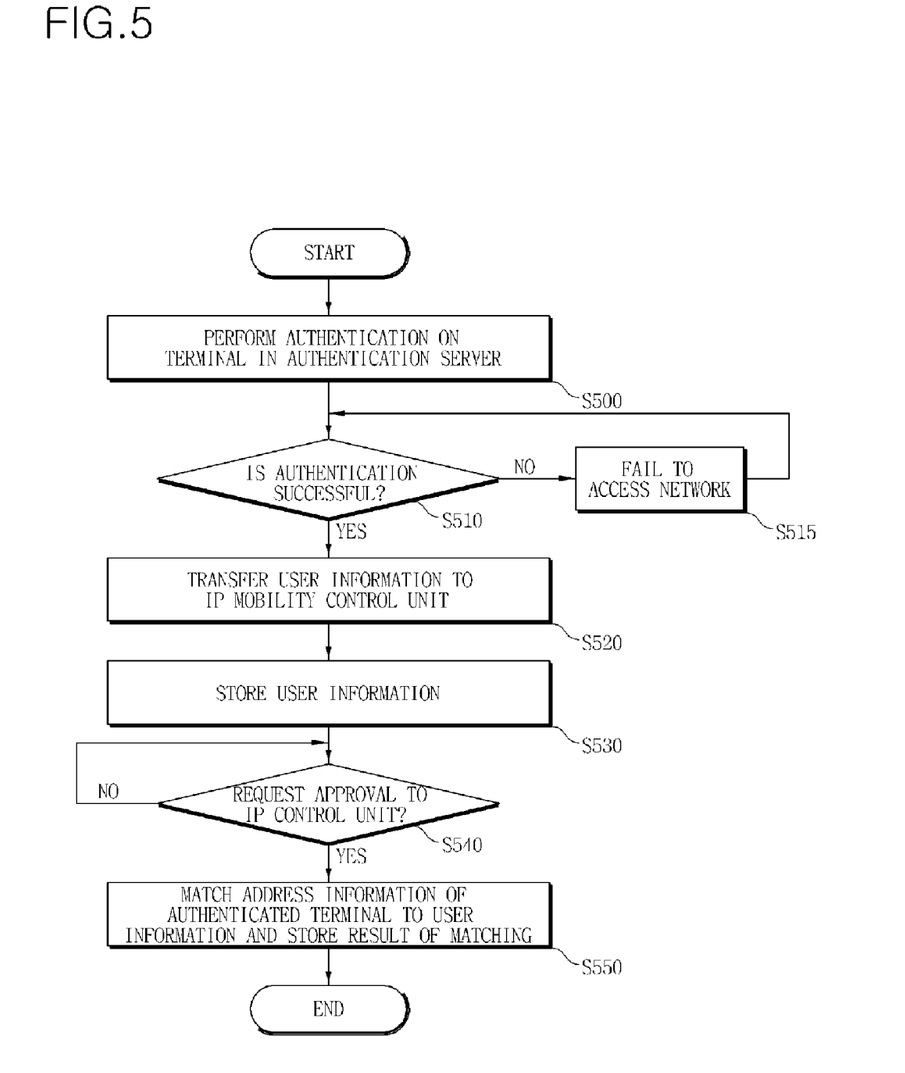
FIG. 5 is a flowchart of a terminal authentication operation of a call control method of ensuring service continuity, according to an embodiment of the present invention.

FIG. 5 is a flowchart of a terminal authentication operation of a call control method of ensuring service continuity, according to an embodiment of the present invention.

First, when a terminal tries to access a network, an authentication server performs authentication on the network. That is, the terminal requests user authentication to the authentication server. The authentication server performs authentication on the terminal on the basis of user information stored in a user DB (operation S500).

If the user authentication fails (operation S510), the terminal cannot access the network (operation S515). If the terminal fails to access the network according to the failure of the user authentication, the authentication server can transfer a failure message to the terminal.

If the user authentication is successful (operation S510), the authentication server transfers the authenticated user information to the IP mobility control unit (operation S520). The IP mobility control unit stores the user information received from the authentication server (operation S530).

The IP mobility control unit receives a permanent IP address and transport IP address of the terminal from the terminal which is authenticated by the authentication server, thereby receiving an authentication request (operation S540).

The IP mobility control unit matches the permanent IP address and transport IP address of the terminal to pre-stored user information, thereby allowing or disallowing communications (operation S550). Thereafter, the IP mobility control unit interfaces with a service control unit and performs call control on the basis of the stored permanent IP address and transport IP address information.

Meanwhile, a call control method for ensuring service continuity may be written by a computer program. Also, the program may be stored in a computer readable media, and read and executed by a computer. The computer readable media may be a magnetic recording medium, an optical recording medium, etc.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A call control method for ensuring service continuity in a mobile communication service environment, which is performed by a service control unit to control a Session Initiation Protocol (SIP)-based service, comprising:

receiving a call signal message including permanent IP addresses and transport IP addresses from a transmitter terminal and a receiver terminal, and acquiring the permanent IP addresses and the transport IP addresses of the transmitter terminal and the receiver terminal, wherein the permanent IP address does not participate in data transmission and is used as an identifier (ID) through which the location of the terminal is registered, and the transport IP address participates in actual data transmission;

performing call control between the transmitter terminal and the receiver terminal on the basis of the transport IP addresses and the permanent IP addresses of the transmitter terminal and the receiver terminal, wherein the permanent IP address of a terminal is part of a payload of the call signal message;

wherein the performing of the call control, comprises, in the service control unit, transmitting the permanent IP addresses and Quality of Service (QoS) information of the transmitter terminal and the receiver terminal to an IP mobility control unit;

wherein in the IP mobility control unit, acquiring the transport IP addresses of the transmitter terminal and the receiver terminal from pre-stored information on the basis of the permanent IP addresses of the transmitter terminal and the receiver terminal; and transferring the transport IP addresses and the QoS information of the transmitter terminal and the receiver terminal to a network control unit.

2. The call control method of claim 1, wherein the receiving of the call signal message comprises:

in the service control unit, acquiring the transport IP address of the receiver terminal from an IP mobility control unit in response to a call connection request from the transmitter terminal;

transmitting the call connection request to the receiver terminal on the basis of the transport IP address of the receiver terminal; and acquiring the permanent IP address of the receiver terminal by receiving a response message to the call connection request from the receiver terminal.

3. The call control method of claim 1, wherein the receiving of the call signal message comprises, in the service control unit, acquiring the permanent IP address and the transport IP address of the transmitter terminal in response to a call connection request from the transmitter terminal.

4. The call control method of claim 1, after the transferring of the transport IP addresses and the QoS information, further comprising, in the network control unit, performing control of point-to-point network resources on the basis of the transport IP addresses of the transmitter terminal and the receiver terminal which are received from the IP mobility control unit.

5. The call control method of claim 4, after the performing of the control of the point-to-point network resources, further comprising, in the IP mobility control unit, informing the transmitter terminal of the transport IP address of the receiver terminal and informing the receiver terminal of the transport IP address of the transmitter terminal.

6. The call control method of claim 1, after the transferring of the transport IP addresses and the QoS information, further comprising, in the network control unit, performing QoS provisioning on the basis of the transport IP addresses of the transmitter terminal and the receiver terminal which are received from the IP mobility control unit.

7. The call control method of claim 6, after the performing of the QoS provisioning, further comprising, in the IP mobility control unit, informing the transmitter terminal of the transport IP address of the receiver terminal and informing the receiver terminal of the transport IP address of the transmitter terminal.

8. The call control method of claim 1, further comprising, in an IP mobility control unit, receiving authentication user information from an authentication server and storing the authenticated user information.

9. The call control method of claim 1, further comprising, receiving a permanent IP address and a transport IP address of a terminal authenticated by the authentication server, matching the permanent IP address and the transport IP address of the terminal to the authenticated user information, and storing the result of the matching.

\* \* \* \* \*